United States Patent [19]

Nakayama et al.

[11] Patent Number: 4,954,884
[45] Date of Patent: Sep. 4, 1990

[54] METHOD AND APPARATUS FOR AUTOMATICALLY ADJUSTING WHITE BALANCE

[75] Inventors: Yoshiaki Nakayama; Kenji Saito; Yukihiro Kawada, all of Tokyo, Japan

[73] Assignee: Fuji Photo Film Co., Ltd., Kanagawa, Japan

[21] Appl. No.: 290,287

[22] Filed: Dec. 27, 1988

[30] Foreign Application Priority Data

Dec. 29, 1987 [JP] Japan ................................ 62-334866

[51] Int. Cl.$^5$ ............................................. H04N 9/71
[52] U.S. Cl. .................................................... 358/29
[58] Field of Search .......................... 358/29, 41, 29 C

[56] References Cited

U.S. PATENT DOCUMENTS 4,797,733 1/1989 Takagi et al. ......................... 358/29

Primary Examiner—James J. Groody
Assistant Examiner—Davi E. Harvey
Attorney, Agent, or Firm—Birch, Stewart, Kolasch & Birch

[57] ABSTRACT

An automatic white balance adjusting method in which color difference signals ($E_R - E_Y$) and ($E_B - E_Y$) are respectively integrated on the entire screen and the gains of red and blue signals are controlled such that the average integration values can coincide with predetermined reference levels respectively. In the method, in integrating the color difference signals ($E_R - E_Y$) and ($E_B - E_Y$), the integration of the color difference signal that includes a chromatic color is prohibited. Whether or not the color difference signal includes the chromatic color is checked by whether at least one of a plurality of color signals including a color signal ($E_R + E_B - 2E_Y$), obtained by addition of the above-mentioned color difference signals, exceeds its associated one of a plurality of threshold levels which are set correspondingly to the respective color signals.

6 Claims, 5 Drawing Sheets

STANDARD COLOR BAR

SIGNAL ($E_R - E_Y$)

SIGNAL ($E_B - E_Y$)

SIGNAL ($E_R + E_B - 2E_Y$)

SIGNAL ($E_R - E_B$)

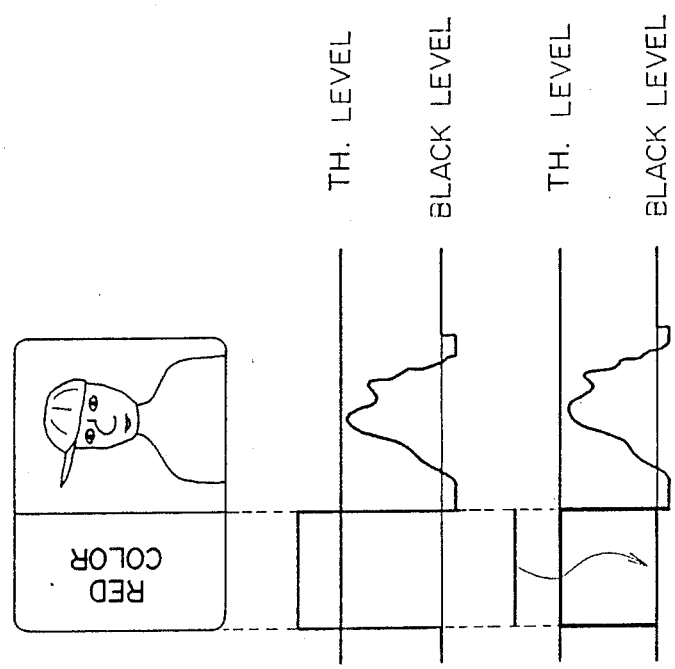
FIG. 5 (A) PICTURE
FIG. 5 (B) COLOR DIFFERENCE SIGNAL ($E_R - E_Y$)
FIG. 5 (C) COLOR DIFFERENCE SIGNAL AFTER BLANKED ($E_R - E_Y$)

METHOD AND APPARATUS FOR AUTOMATICALLY ADJUSTING WHITE BALANCE

BACKGROUND OF THE INVENTION

1. Field of the Invention

The present invention relates to a method and apparatus for automatically adjusting white balance or, in particular, to a method and apparatus for automatically adjusting white balance using and internal light measurement system.

2. Description of the Related Art

Conventionally, an automatic white balance adjusting method includes an internal light measurement system in which the white balance can be adjusted by means of the light that is striking an object. In this internal light measurement system, when the white balance is correct, it is assumed that the average of the color difference signals on the entire screen frequently provides a given reference level showing white or grey, and therefore, the gains of the signals of red/blue are feedback controlled so that the average of the color difference signals $(E_R-E_Y)$ and $(E_B-E_Y)$ becomes the above-mentioned reference level.

However, in the above system, when the above-mentioned assumption does not hold, for example, in the case of an object with a blue sky and a blue sea for a background, or in the case of an object with a red wall for a background, color difference signals over the entire screen if they are integrated (or averaged), provide blue or red, not grey. If the above-mentioned white balance adjustment is made on such objects, then the backgrounds are caused to fade and the colors of a figure and the like as main objects are controlled in the direction of a complementary color (strong color), resulting in a so called color failure.

In view of this, in order to solve the above-mentioned problem, the present applicant filed an application in Japan for a patent (Japanese Patent Application No. 62-202509 and the like) relating to an automatic white balance adjusting method in which strong colors (chromatic colors) are removed from an original picture and only the color information on the portion of achromatic colors such as white, grey and the like within the screen is integrated, thereby eliminating the fading of the background and the miscontrol of main object or the above-mentioned color failure.

A description will be given below of the above-mentioned automatic white balance adjusting method.

First of all it is assumed that, from a picture containing a strong red color as shown in FIG. 5(A), a color difference signal $(E_R-E_Y)$ as shown in FIG. 5(B) is obtained. When this color difference signal is integrated over the entire screen, the resultant average value is moved in the red direction from a black level. For this reason, if the above-mentioned automatic white balance adjustment is made, then the color of the face of a man is miscontrolled in the direction of the complementary color (cyan) of red.

In view of this, in order to blank the color difference signal, showing the strong red, out of the picture in FIG. 5(A), there is established a certain level (a threshold level) and the strong color difference signals exceeding the threshold level are blanked to a black level (black level of a reference color temperature) as shown in FIG. 5 (C). As a result of this, the strong color difference signal is removed from the color difference signal of the original picture so that the average value of the color difference signal can be made to approach a grey color.

Referring now to FIG. 4, there is shown a block diagram of an example of an automatic white balance adjusting apparatus employing the above mentioned principle. As shown in FIG. 4, the light that enters through a lens 10 is photoelectrically converted to signals of red, green, and blue $(E_R, E_G, E_B)$ by means of an image pickup element 12. The signals $E_R, E_G, E_B$ are respectively passed through amplifiers 14, 16, 18 and are then fed to a matrix circuit 20, where the signals are converted to a brightness signal $E_Y$ and color difference signals $(E_R-E_Y)$, $(E_B-E_Y)$ and then are input to an encoder 22. In the encoder 22, the color difference signals are rectangular two-phase modulated and are then added to the brightness signal $E_Y$. The thus modulated and added signals are fed out as video signals in the NTSC system from the encoder 22.

On the other hand, the color difference signal $(E_R-E_Y)$ and $(E_B-E_Y)$ are fed to a blanking control part 40.

The blanking control part 40 composed of an upper threshold level setting means 41A for the color difference signal $(E_R-E_Y)$, a lower threshold level setting means 41B, comparators 42A, 42B, an AND circuit 43, a blanking switch 44, an upper threshold level setting means 45A for the color difference signal $(E_B-E_Y)$, a lower threshold level setting means 45B, comparators 46A, 46B, an AND circuit 47, and a blanking switch 48.

The upper and lower threshold level setting means 41A and 41B are respectively used to generate upper and lower threshold levels for blanking strong color difference signals on the red and cyan sides of the color difference signal $(E_R-E_Y)$, and then also output the upper and lower threshold levels, respectively.

The upper threshold level and the color difference signal $(E_R-E_Y)$ are respectively applied to the positive and negative inputs of the comparator 42A. The comparator 42A compares these two input signals to output an H level signal when the color difference signal $(E_R-E_Y)$ is smaller than the upper threshold level and to output a strong color difference detection signal (an L level signal) when the color difference signal is greater than the upper threshold level. Also, to the positive and negative inputs of the comparator 42B are applied the color difference signal $(E_R-E_Y)$ and the lower threshold level, respectively. The comparator 42B compares these two input signals and outputs the H level signal when the color difference signal $(E_R-E_Y)$ is greater than the lower threshold level while it outputs the strong color difference detection signal (L level signal) when the color difference signal is smaller than the lower threshold level.

The AND circuit 43 outputs an H level signal when both of the two input signals from the comparators 42A, 42B are both H level signals, that is, when the color difference signal $(E_R-E_Y)$ is present between the upper and lower threshold levels, while it outputs an L level signal when at least one of the two input signals is an L level signal, that is, when the color difference signal $(E_R-E_Y)$ goes beyond the upper or lower threshold level.

The blanking switch 44 comprises an input contact 44A to which the color difference signal $(E_R-E_Y)$ is input, and input contact 44B to which a reference level from a reference level setting means 32 is input, and a movable contact 44C which can be selectively connected to one of the contacts 44A, 44B. When the H level signal is input from the AND circuit 43, the blanking switch 44 connects the movable contact 44C to the contact 44A and outputs the color difference signal ($E_R-E_Y$) to an integrating circuit 24. When the level signal is input from the AND circuit 43, the blanking switch 44 connects the traveling contact 44C to the contact 44B and outputs the reference level to the integrating circuit 24.

On the other hand, the upper and lower threshold level setting means 45A and 45B are used to set up the upper and lower threshold levels which are respectively used to blank a strong color difference signal on the blue side of the color difference signal ($E_B-E_Y$) and a strong color difference signal on the yellow side thereof. Also, the comparators 46A, 46B, AND circuit 47 and blanking switch 48 can be operated similarly to the above-mentioned comparators 42A, 42B, AND circuit 43 and blanking switch 44 and, therefore, their detailed description is omitted here.

As can be understood from the foregoing description, the color difference signals ($E_R-E_Y$) and ($E_B-E_Y$) are integrated by the integrating circuits 24 and 26, respectively. In such integration, when the color difference signal provides a strong color difference signal going beyond the upper or lower threshold level, the strong color difference signal is blanked before the color difference signal is integrated, that is, the reference level is integrated in place of the strong color difference signal.

The integration average values integrated by the above-mentioned integrating circuits 24 and 26 are then input to the negative inputs of difference amplifiers 28 and 30, respectively. Also, to the positive inputs of the difference amplifiers 28 and 30 there are input from reference level setting means 32 and 34 reference levels which are, respectively, the average values of the color difference signals ($E_R-E_Y$) and ($E_B-E_Y$) when the average value of the colors over the entire screen shows a grey color. Thus, the difference amplifier 28 outputs to the amplifier 14 a gain control signal R $_{CONT}$ which can be obtained by amplifying a difference between the above-mentioned two input signals, thereby controlling the gain of a primary color signal $E_R$ which is amplified by the amplifier 14. Also, the difference amplifier 30 outputs to the amplifier 18 a gain control signal B $_{CONT}$ which can be obtained by amplifying the difference between the above-mentioned two input signals, thereby controlling the gain of a primary color signal $E_B$ to be amplified by the amplifier 18. By means of this, the primary color signals $E_R$, $E_B$ are controlled in such a manner that the average values of the color difference signals ($E_R-E_Y$), ($E_B-E_Y$) over the entire screen can coincide with the reference levels, respectively.

However, since the color difference signals ($E_R-E_Y$) and ($E_B-E_Y$) vary greatly with respect to the variations of the color temperature, the width of the threshold levels in the above-mentioned threshold level setting means 41A, 41B, 45A, 45B must be comparatively greater and, as a result of this, the strong color cannot be removed to a sufficient degree. Also, if the width of the threshold level is made narrow, then even the portion of the signal that should not be blanked is blanked, which is a disadvantage.

On the other hand, it is possible to make the threshold level width comparatively smaller by finding the average value of the color difference signal over the entire screen and moving the threshold level parallel only by the variation of the above average value that varies according to the variation of the color temperature. In this case, however, other problems arise; for example, a circuit for setting the threshold level becomes complicated.

SUMMARY OF THE INVENTION

The present invention aims at eliminating the drawbacks found in the above-mentioned prior art methods and apparatus.

Accordingly, it is an object of the invention to provide both method and apparatus for automatically adjusting white balance in which a threshold level can be fixed and the width of the threshold level can be made narrow. A color of low saturation and a color having a color difference itself can be removed, and the color information that is used for adjustment of the white balance can be limited to the color information in a range in which an achromatic color portion is considered to vary according to a color temperature so as to be able to achieve an improvement in white balance adjustment.

In order to attain the above and other objects, according to the present invention, there is provided an automatic white balance adjusting method in which color difference signals ($E_R-E_Y$) and ($E_B-E_Y$) are respectively produced from signals obtained by photographing an object. The color difference signals are respectively integrated over the entire screen, and the gains of red and blue colors are controlled such that the integrated average values provide predetermined reference levels respectively. The method comprises the steps of: producing the respective color difference signals from a plurality of color signals including a color signal ($E_R+E_B-2E_Y$) obtainable by addition of the respective color difference signals in accordance with the signals obtained by photographing the object; setting threshold levels respectively for removal of chromatic colors according to the thus produced color signals; and, prohibiting integration of the respective color difference signals for a period in which at least one of the color signals is beyond said set threshold level to thereby remove a color difference signal including a color.

According to the invention, in view of the fact that the above-mentioned color signal ($E_R+E_B-2E_Y$) will not vary greatly with respect to the variation of the color temperature, the color signal ($E_R+E_B-2E_Y$) is produced from the signals that are obtained by photographing an object. However, since some of strong colors cannot be removed only by this color signal, other color signals are produced to remove such strong colors. And, when the color difference signals ($E_R-E_Y$) and ($E_B-E_Y$) produced from the signals that are obtained by photographing the object are respectively integrated to find the average value thereof on the entire screen, if at least one of a plurality of color signals including the above-mentioned color signal ($E_R+E_B-2E_Y$) goes beyond a pre-selected threshold level, then the color difference signal ($E_R-E_Y$) or ($E_B-E_Y$) is considered not to be an achromatic color portion, so that integration of such color difference signal is prohibited during such a period. In other words, even when the average value of an original picture on the entire screen does not provide a grey color, integration of only information on a portion adjacent to a comparatively achromatic color with a strong color being removed from the original picture is possible even if the color temperature varies, and the gains of red and blue signals are controlled such that the integration average value is made to approach to the grey color having a reference color temperature, so that an excellent white balance adjustment can be achieved.

BRIEF DESCRIPTION OF THE DRAWINGS

The exact nature of this invention, as well as other objects and advantages thereof, will be readily apparent from consideration of the following specification relating to the accompanying drawings in which like reference characters designate the same or similar parts throughout the figures thereof and wherein.

DETAILED DESCRIPTION OF THE DRAWINGS

The following detailed description will be to given of the preferred embodiment of method and apparatus for automatically adjusting white balance according to the present invention with reference to the accompanying drawings.

The basic principle of the present invention is the same with that of the above-mentioned prior application by the present applicant. However, while the prior application employs the two color difference signals $(E_R-E_Y)$ and $(E_B-E_Y)$ as a comparison reference for removal of a chromatic color, the present invention employs, as a comparison reference for removal of a chromatic color, the color signal that can be obtained by addition of at least the above-mentioned color difference signals $(E_R+E_Y)$ and $(E_B-E_Y)$.

Next, description will be given below of the reason why the above-mentioned color signal $(E_R+E_B-2E_Y)$ is used as the comparison reference in the present invention.

Figure 2:
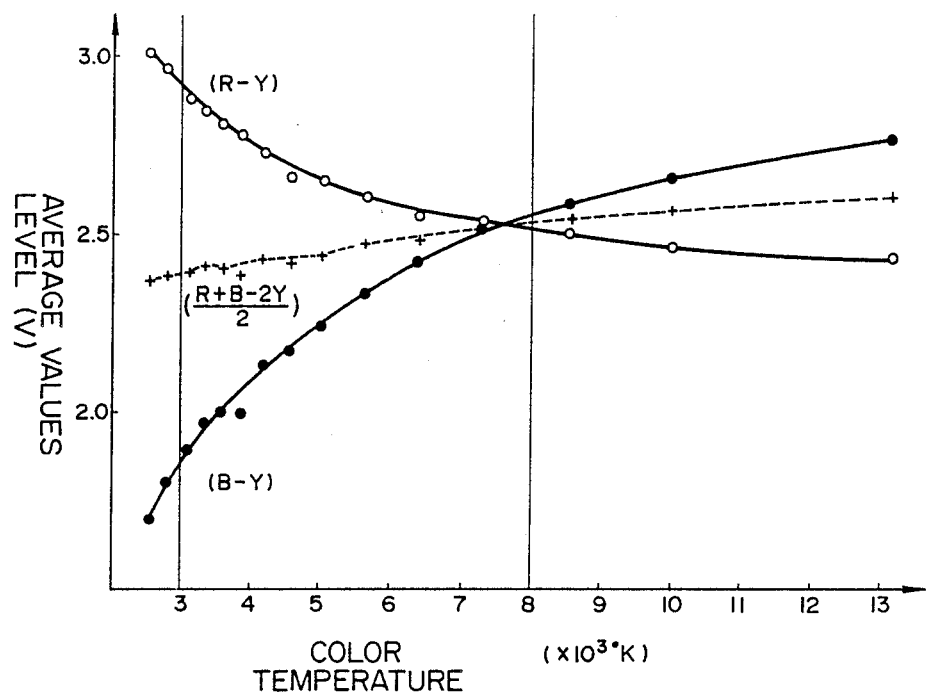
FIG. 2 is a graphical representation of the respective average value levels of color difference signals $(E_R-E_Y)$, $(E_B-E_Y)$ and a color signal $(E_R+E_B-2E_Y)/2$, using a color temperature as a parameter.
Figure 3A:
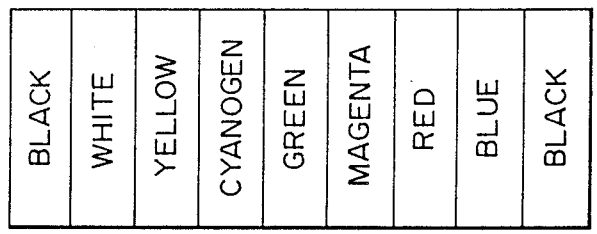
FIGS. 3(A) through 3(E) are views, respectively illustrating a standard color bar, amplitude values of signals $(E_R-E_Y)$, $(E_B-E_Y)$, $(E_R+E_B-2E_Y)$ and $(E_R-E_B)$ with respect to the respective colors in the standard color bar.
Figure 3B:
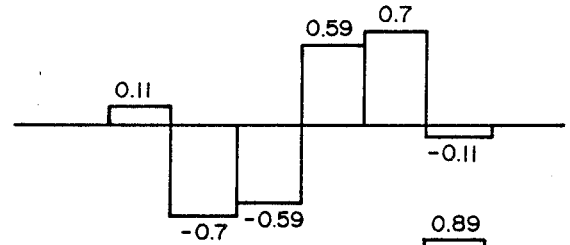
Figure 3C:
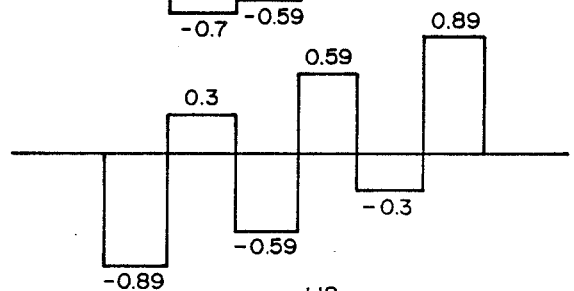
Figure 3D:
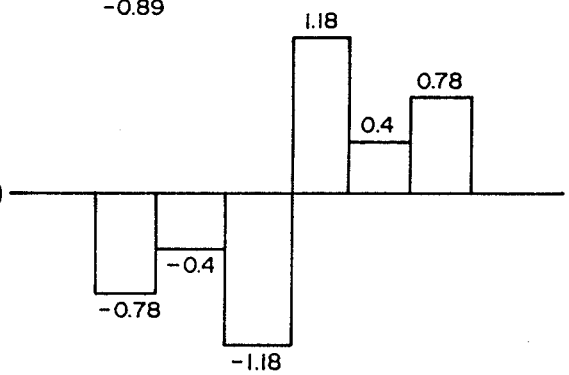
Figure 3E:
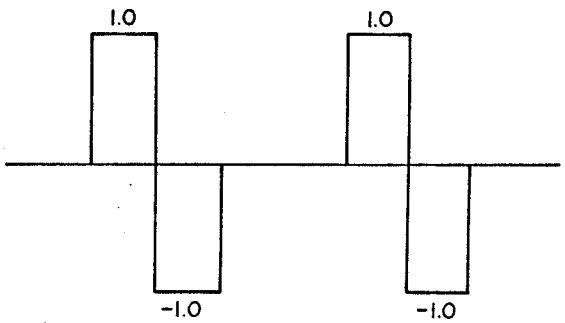

In FIG. 2, there is shown a graph in which the respective average value levels of the color difference signals $(E_R-E_Y)$, $(E_B-E_Y)$ and the color difference signal $(E_R+E_B-2E_Y)$ are represented using a color temperature as a parameter. As shown in FIG. 2, when the variations of the color temperatures (3000° K.~8000° K.) are observed carefully as a target, the color difference signals $(E_R-E_Y)$ and $(E_B-E_Y)$ vary greatly according to the variations of the color temperatures, respectively, but it is found that these color difference signals $(E_R-E_Y)$ and $(E_B-E_Y)$ have variation characteristics which bear mutually positive and negative relation to each other. Therefore, the variations of the color signal $(E_R+E_B-2E_Y)$ obtained by addition of the above-mentioned two color difference signals are substantially cancelled to a very low level, so that the combined color signal provides a highly stable signal.

For this reason, if the combined color signal $(E_R+E_B-2E_Y)$ is employed as a comparison reference and the width of the variations of the color signal is set as the width of a threshold level, then, due to the fact that a portion belonging to a range within such width can be inherently considered as an achromatic color portion, the threshold level that is used to remove a chromatic color portion can be fixed as well as the width of the threshold level can be reduced sufficiently.

Also, since there is present a strong color portion which cannot be removed only by the above-mentioned color signal $(E_R+E_B-2E_Y)$, a second comparison reference is also employed to remove such strong color portion. That is, in the present embodiment, there is employed as the second comparison reference a color signal $(E_R-E_B)$ which is obtained by subtracting the color difference signal $(E_B-E_Y)$ from the color difference signal $(E_R-E_Y)$. It is true that the color signal $(E_R-E_B)$ is not stable with respect to the variations of the color temperatures. But, as will be discussed later, an achromatic color portion is detected as a result of comparison at least in the stable color signal $(E_R+E_B-2E_Y)$ and a feedback control is exerted only on the achromatic portion, which causes the color signal to change in a desired direction. For this and other reasons, a fixed threshold level in a comparatively narrow range can be set for the color signal $(E_R-E_B)$ as well.

Figure 1:
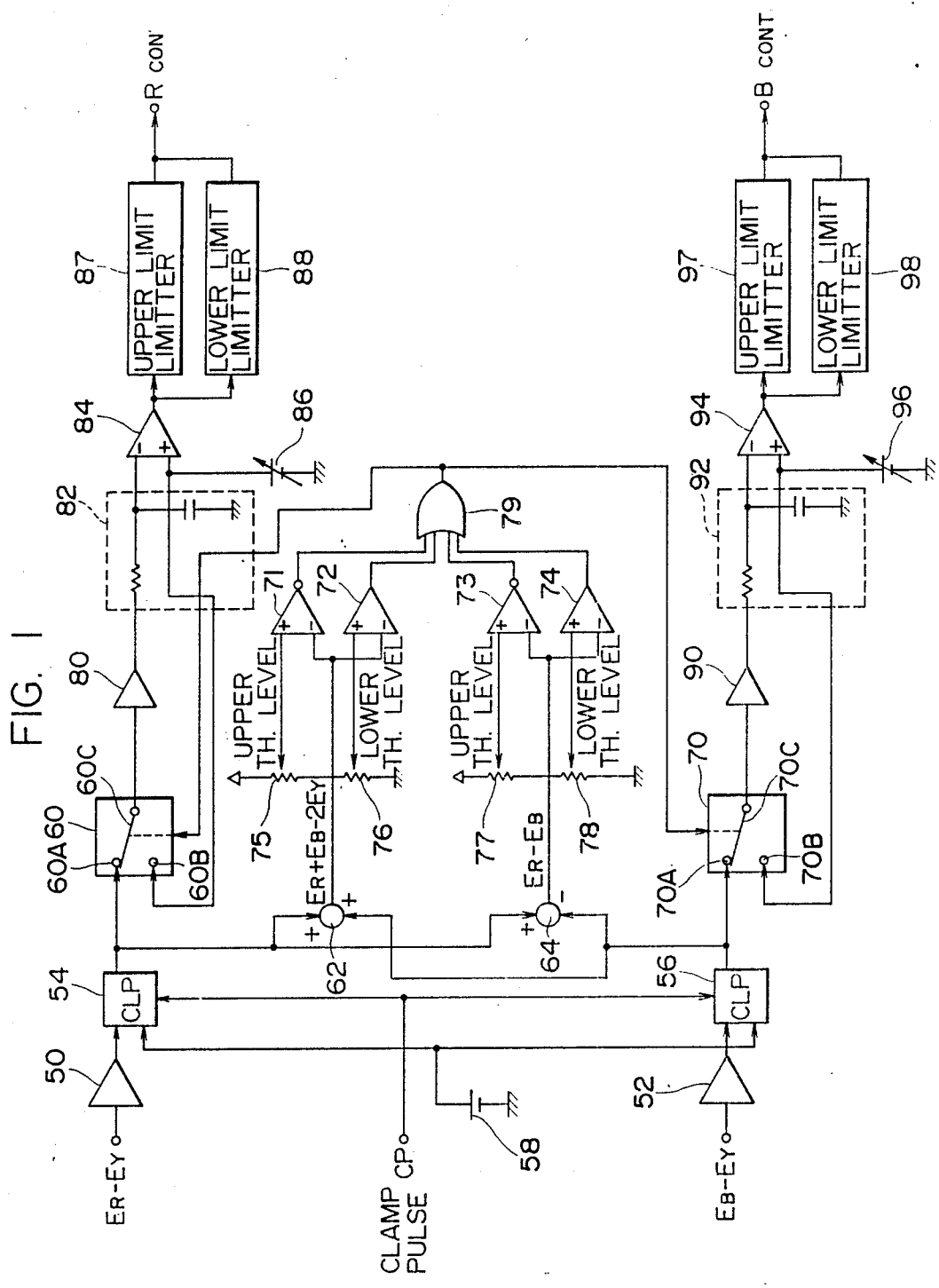
FIG. 1 is a block diagram of an embodiment of the main portion of an automatic white balance adjusting apparatus according to the present invention.
Figure 4:
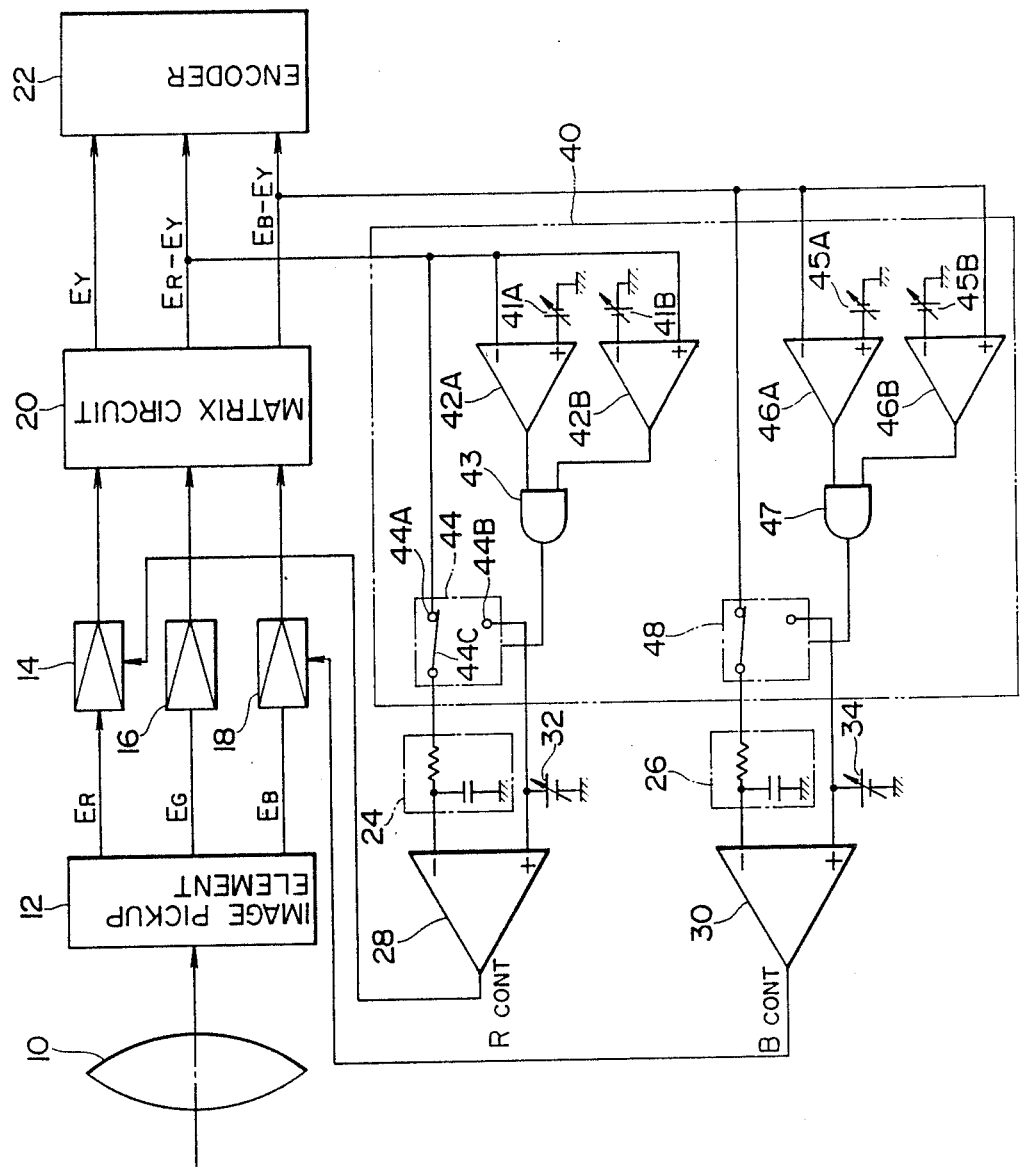
FIG. 4 is a block diagram of an example of an automatic white balance adjusting apparatus according to the prior art; and, FIGS. 5(A) through 5(C) are respectively explanatory views to illustrate a basic principle which is applied to the apparatus shown in FIG. 4.

FIG. 1 is a block diagram illustrative of an embodiment of the main components of an automatic white balance adjusting apparatus according to the present invention and it, as shown in FIG. 4, relates to a circuit to produce gain control signals R $_{CONT}$ and B $_{CONT}$ which are used to control the gains of amplifiers 14 and 18 in accordance with the color difference signals $(E_R-E_Y)$ and $(E_B-E_Y)$ input from a matrix circuit 20.

In FIG. 1, the color difference signals $(E_R-E_Y)$ and $(E_B-E_Y)$ are applied through amplifiers 50, 52 to clamp circuits 54, 56, respectively. Since there are input to the clamp circuits 54 and 56 clamp pulses CP and DC values (reference levels) to be pedestal clamped from setting means 58, respectively, the clamp circuit 54 pedestal clamps the color difference signal $(E_R-E_Y)$ in synchronization with the clamp pulse CP and then outputs it to a switch 60, an adder 62 and a subtractor 64. Similarly, the clamp circuit 56 pedestal clamps the color difference signal $(E_B-E_Y)$ in synchronization with the clamp pulse CP and then outputs it to a switch 70, the adder 62 and the subtractor 64.

The adder 62 adds the thus input two color difference signals $(E_R-E_Y)$ and $(E_B-E_Y)$ and outputs the addition value thereof, that is, the color signal $(E_R+E_B-2E_Y)$ to the negative inputs of comparators 71 and 72, while the subtractor 64 subtracts the color difference signal $(E_B-E_Y)$ from the color difference signal $(E_R-E_Y)$ and outputs the subtraction value thereof, that is, the color signal $(E_R-E_B)$ to the negative inputs of comparators 73 and 74.

On the other hand, to the positive inputs of the comparators 71 and 72, there are input upper and lower threshold levels from upper and lower threshold level setting means 75 and 76, respectively, and, likewise, to the positive inputs of the comparators 73 and 74, there are input upper and lower threshold levels from upper and lower threshold level setting means 77 and 78, respectively. It should be noted here that these threshold level setting means 75~78 are adapted to be able to vary their respective threshold levels but, after they are adjusted in their threshold levels when they are delivered as commercial products from their factory, the respective threshold levels remains fixed.

The comparators 71 and 72 respectively output L level signals when the color signal $(E_R+E_B-2E_Y)$ stands between the upper and lower threshold levels that are set for the color signal, and they respectively output H level signals when they go beyond the upper threshold levels or go below the lower threshold levels. Also, the comparators 73 and 74 respectively output L level signals when the color signal $(E_R-E_B)$ is present between the upper and lower threshold levels that are set for the color signal, and they respectively output H level signals when they go beyond the upper threshold level or go below the lower threshold level. And, the output signals of the above-mentioned four comparators 71~74 are respectively guided through an OR circuit 79 to the switches 60 and 70.

The switches 60 and 70 normally connect the movable contacts 60C and 70C to contacts 60A and 70A respectively to guide the pedestal clamped color signal $(E_R-E_Y)$ and $(E_B-E_Y)$ through buffers 80 and 90 to integration circuits 82 and 92 respectively. However, when one or more H level signals are input thereto through the OR circuit 79 from at least one of the four comparators 71~74 the switches 60 and 70 respectively disconnect the movable contacts 60C, 70C out of the contacts 60A and 70A and connect the contacts to contacts 60B and 70B for inputting of the reference levels, thereby guiding the reference levels to the integration circuits 82 and 92.

The integration circuits 82 and 92 are respectively adapted to integrate the color difference signals $(E_R-E_Y)$ and $(E_B-E_Y)$. However, as mentioned before, while the color signal $(E_R+E_B-2E_Y)$ or $(E_R-E_B)$ exceeds the range of the threshold levels previously set, the circuits 82 and 92 respectively blank and integrate the color difference signals $(E_R-E_Y)$ and $(E_B-E_Y)$ that are being output during such duration, that is, they integrate the reference levels in place of the color difference signals.

The integration average values obtained by the above-mentioned integration by the integration circuits 82 and 92 are input respectively to the negative inputs of difference amplifiers 84 and 94, while to the positive inputs of the difference amplifiers 84 and 94 there are input respectively from reference level setting means 86 and 96 the reference levels that are the average values of the color difference signals $(E_R-E_Y)$ and $(E_B-E_Y)$ obtained when the color average value on the entire screen provides the grey color.

The difference amplifier 84 outputs through upper and lower limit limiters 87 and 88 to the amplifier 14 the gain control signal $R_{CONT}$ that is obtained by amplification of the difference between the above-mentioned two input signals (FIG. 4) to thereby control the gain of the primary color signal $E_R$ that is amplified by the amplifier 14. Also, the difference amplifier 94 outputs through upper and lower limit limiters 97 and 98 to the amplifier 18 the gain control signal $B_{CONT}$ that is obtained by amplification of a difference between the above-mentioned two input signals to thereby control the gain of the primary color signal $E_B$ that is amplified by the amplifier 18. The above-mentioned upper and lower limit limiters 87, 88, 97, 98 control the upper and lower limits of the gain control signals $R_{CONT}$ and $B_{CONT}$ that are respectively output from the difference amplifiers 84 and 94 so as to prevent more gain control than necessary with respect to the red and blue signals.

In this manner, the primary color signals $E_R$, $E_B$ are feedback controlled in such a manner that the average values on the entire screen of the color difference signals $(E_R-E_Y)$ and $(E_B-E_Y)$ exclusive of the strong color portions can coincide with the reference levels respectively.

Here, when the combinations of the primary colors are formed with respect to the respective colors in the standard color bar shown in FIG. 3 (A) and also the primary color signals with respect to the brightest white are set such that $E_R=E_G=E_B=1.0$, then the amplitude values of the color difference signals $(E_R-E_Y)$, $(E_B-E_Y)$ and the color signals $(E_R+E_B-2E_Y)$, $(E_R-E_B)$ with respect to the respective colors in the standard color bar are as shown in FIGS. 3 (B) through 3 (E).

As shown in these figures, when the color difference signals $(E_R-E_Y)$ and $(E_B-E_Y)$ are used as the comparison references, the green, magenta and the like cannot be detected easily, but, when the color signal $(E_R+E_B-2E_Y)$ and $(E_R-E_B)$ are employed as the comparison references, then the colors can be detected more easily, because green and magenta are made larger than the color signal $(E_R+E_B-2E_Y)$ and yellow, cyan, red and blue are made larger than the color signal $(E_R-E_B)$ before they are compared.

Also, although in the present embodiment the reference levels are applied to the contacts 60B and 70B of the switches 60 and 70 respectively, this is not limiting, but arbitrary levels in the neighborhood of the reference levels may also be applied. Further, when the contacts 60B and 70B are insulated and the movable contacts 60C and 70C are switched over to these contacts, the integration circuits 82 and 92 may be set in a floating input state, that is, the input and output of signals into and out of the integration circuits 82 and 92 are prohibited so as to be able to maintain the integration values.

As has been described hereinbefore, in the method and apparatus for automatically adjusting the white balance according to the invention, if a chromatic color is included in a picture, then the color difference signals $(E_R-E_Y)$, $(E_B-E_Y)$ that contain the chromatic color are not integrated and, therefore, even when a large number of characteristic chromatic colors are present on the entire screen, the integration average values of the color difference signals $(E_R-E_Y)$ and $(E_B-E_Y)$ consisting of an achromatic color portion extracted from the entire screen can be made to approach a grey color of a reference color temperature, thereby eliminating an erroneous control such as color fading, color failure and the like. Especially, since a color signal $(E_R+E_B-2E_Y)$ which is stable with respect to the variations of color temperatures is used to detect the color difference signals $(E_R-E_Y)$ and $(E_B-E_Y)$ that include the chromatic colors, the threshold level with respect to this color signal can be fixed and the width of the threshold level can also be made sufficiently narrow, whereby a color having a comparatively lower saturation and a color having a small color difference can also be removed, so that an improved white balance adjustment can be achieved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic white balance adjusting method in which color difference signals $(E_R-E_Y)$ and $(E_B-E_Y)$ are respectively produced from signals obtained by photographing an object, said color difference signals are respectively integrated on the entire screen, and the gains of red and blue signals are controlled such that average values resulting from said integration of said color difference signals can respectively provide predetermined reference levels, said method comprising the steps of:

producing a plurality of color signals including a color signal $(E_R+E_B-2E_Y)$ obtained by addition of said two color difference signals in accordance with signals obtained by photographing said object;

setting upper threshold levels and lower threshold levels for removal of chromatic colors respectively according to said respective color signals produced; and, prohibiting said integration of said respective color difference signals for a period wherein at least one of said color signals goes beyond one of said upper threshold levels or below one of said lower threshold levels to remove the color difference signal that includes a chromatic color.

2. An automatic white balance adjusting apparatus comprising: first and second gain control circuits respectively for controlling the gains of red and blue signals among signals obtained by photographing an object;

first and second integration circuits respectively for integrating color difference signals $(E_R-E_Y)$ and $(E_B-E_Y)$ produced from said signals obtained by photographing said object on the entire screen;

color signal production means for producing a plurality of color signals including a color signal $(E_R+E_B-2E_Y)$ obtained by addition of said two color difference signals in accordance with said signals obtained by photographing said object;

a plurality of upper threshold level setting means respectively for setting upper threshold levels for removal of chromatic colors respectively according to said plurality of color signals produced;

a plurality of lower threshold level setting means respectively for setting threshold levels for removal of chromatic colors respectively according to said plurality of color signals produced;

a plurality of upper comparators each provided for each of said plurality of color signals for inputting said color signal associated therewith and said upper threshold level set correspondingly to said color signal and for outputting a chromatic color detection signal when said color signal goes beyond said upper threshold level;

a plurality of lower comparators each provided for each of said plurality of color signals for inputting said color signal associated therewith and said lower threshold level set correspondingly to said color signal and for outputting a chromatic color detection signal when said color signal goes below said lower threshold level;

first and second switches respectively for preventing said color difference signals from being received by said first and second integration circuits respectively during a period wherein at least one of said plurality of upper and lower comparators is outputting a chromatic color detection signal;

first and second reference level setting means respectively for setting predetermined reference levels with which the average values of said color difference signals on the entire screen must coincide;

first means for comparing the average integration value obtained by said first integration circuit with said reference level set by said first reference level setting means to adjust the gain of said first gain control circuit such that said average value and said reference level can coincide with each other; and, second means for comparing the average integration value obtained by said second integration circuit with said reference level set by said second reference level setting means to adjust the gain of said second gain control circuit such that said average value and said reference level can coincide with each other.

3. An automatic white balance adjusting apparatus as set forth in claim 2, wherein said color signal production means produces, as other color signal than said color signal $(E_R+E_B2E_Y)$, a color signal $(E_R-E_B)$ which can be obtained by subtracting said color difference signal $(E_B-E_Y)$ from said color difference signal $(E_R-E_Y)$.

4. An automatic white balance adjusting apparatus as set forth in claim 2, wherein said first and second switches respectively output to said first and second integration circuits said reference levels set by said first and second reference level setting means in place of said color difference signals while said chromatic color detection signal is being output.

5. An automatic white balance adjusting apparatus as set forth in claim 2, wherein said first and second switches respectively output to said first and second integration circuits predetermined levels respectively representing signals inclining toward a grey level having a reference color temperature in place of said color difference signals while said chromatic color detection signal is being output.

6. An automatic white balance adjusting apparatus as set forth in claim 2, wherein said first and second switches respectively change their respective movable contacts over into the floating input positions thereof so that the integration values of said first and second integration circuits can be maintained, while said chromatic color detection signal is being output.

* * * * *